United States Patent
Kawasaki et al.

(10) Patent No.: US 8,174,432 B2
(45) Date of Patent: May 8, 2012

(54) RADAR APPARATUS

(75) Inventors: Tomoya Kawasaki, Toyota (JP); Hitoshi Mitsumata, Kakogawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 333 days.

(21) Appl. No.: 12/580,450

(22) Filed: Oct. 16, 2009

(65) Prior Publication Data

US 2010/0097264 A1    Apr. 22, 2010

(30) Foreign Application Priority Data

Oct. 21, 2008 (JP) .................. 2008-270895

(51) Int. Cl.
  *G01S 7/28* (2006.01)
  *G01S 13/00* (2006.01)
  *G01S 13/93* (2006.01)
(52) U.S. Cl. .......................... 342/70; 342/175
(58) Field of Classification Search .............. 342/70–72, 342/175
See application file for complete search history.

(56) References Cited

U.S. PATENT DOCUMENTS

| | | | | |
|---|---|---|---|---|
| 4,802,096 A * | 1/1989 | Hainsworth et al. | .......... | 701/301 |
| 5,042,858 A * | 8/1991 | Schubert et al. | ................. | 293/24 |
| 5,646,613 A * | 7/1997 | Cho | ............................. | 340/903 |
| 5,699,056 A * | 12/1997 | Yoshida | ........................ | 340/905 |
| 5,872,536 A * | 2/1999 | Lyons et al. | ..................... | 342/70 |
| 6,944,544 B1 * | 9/2005 | Prakah-Asante et al. | ..... | 701/301 |
| 6,961,023 B2 * | 11/2005 | Fujii et al. | ..................... | 343/713 |
| 7,295,166 B2 * | 11/2007 | Fujii et al. | ..................... | 343/713 |
| 7,477,137 B2 * | 1/2009 | Matsumoto et al. | .......... | 340/436 |
| 7,482,990 B2 * | 1/2009 | Fujii et al. | ..................... | 343/713 |
| 7,663,533 B2 * | 2/2010 | Toennesen et al. | ............. | 342/70 |
| 7,804,443 B2 * | 9/2010 | Nagaishi et al. | ................ | 342/70 |
| 7,911,374 B2 * | 3/2011 | Moriuchi et al. | ............... | 342/70 |
| 8,068,134 B2 * | 11/2011 | Yoshizawa | ..................... | 348/148 |
| 2002/0190915 A1 * | 12/2002 | Barnes et al. | ................. | 343/893 |
| 2004/0117086 A1 * | 6/2004 | Rao et al. | ........................ | 701/36 |
| 2006/0250297 A1 * | 11/2006 | Prakah-Asante et al. | ....... | 342/70 |
| 2006/0274149 A1 * | 12/2006 | Yoshizawa | .................... | 348/148 |
| 2007/0216144 A1 * | 9/2007 | Bannon | ......................... | 280/735 |
| 2009/0207071 A1 * | 8/2009 | Kinoshita et al. | ............. | 342/156 |
| 2010/0033364 A1 * | 2/2010 | Kishida et al. | .................. | 342/70 |
| 2010/0097264 A1 * | 4/2010 | Kawasaki et al. | ............... | 342/70 |

(Continued)

FOREIGN PATENT DOCUMENTS

JP      58028678 A  *  2/1983

(Continued)

OTHER PUBLICATIONS

Office Action issued on Aug. 17, 2010, in Japanese Patent Application No. 2008-270895 (with Partial English Translation).

*Primary Examiner* — John B Sotomayor

(74) *Attorney, Agent, or Firm* — Oblon, Spivak, McClelland, Maier & Neustadt, L.L.P.

(57) ABSTRACT

A radar apparatus mounted in a vehicle includes an inward bent surface and a radar device. The inward bent surface is formed in a lower portion of a bumper of the vehicle, and curves inward with a higher degree of curvature in a horizontal plane than a bumper surface of an upper portion of the inward bent surface. The radar device is placed behind the inward bent surface so that a beam axis of the radar device penetrates the inward bent surface.

9 Claims, 4 Drawing Sheets

U.S. PATENT DOCUMENTS

2010/0103262 A1 * 4/2010 Fardi .................. 348/148

FOREIGN PATENT DOCUMENTS

| JP | 11-38122 | 2/1999 |
|----|----------|--------|
| JP | 11-231041 | 8/1999 |
| JP | 3366299 | 11/2002 |
| JP | 2004-361279 | 12/2004 |
| JP | 2005-142913 | 6/2005 |
| JP | 2007-106199 | 4/2007 |
| JP | 2010101643 A * | 5/2010 |
| WO | WO 2010109517 A1 * | 9/2010 |

* cited by examiner

RADAR APPARATUS

INCORPORATION BY REFERENCE

The disclosure of Japanese Patent Application No. 2008-270895 filed on Oct. 21, 2008 including the specification, drawings and abstract is incorporated herein by reference in its entirety.

BACKGROUND OF THE INVENTION

1. Field of the Invention

The invention relates to a radar apparatus for use in a vehicle.

2. Description of the Related Art

A technology in which a radar apparatus is attached to a vehicle so as to monitor the surroundings of the vehicle, and detects an obstacle or the like is in use. Generally, the radar device of the radar apparatus is installed behind a bumper. For example, Japanese Patent Application Publication No. 11-231041 (JP-A-11-231041) describes a technology in which a radar device is placed behind a bumper, and the bumper is used as a radome. Besides, the radar device is placed on the vehicle so that the beam axis of the radar device faces in the frontal direction of the vehicle, mainly for the purpose of detecting an object present in the frontal direction of the vehicle.

Meanwhile, it is also conceivable to install a radar device so that the device faces obliquely forward of the vehicle, for the purpose of, for example, avoiding a collision at a crossroad, or the like. If the radar device is placed behind the bumper in the case where the radar device is placed obliquely to the frontal direction of the vehicle, the beam axis of the radar device becomes oblique with respect to the bumper. In this case, unlike the case where the beam axis faces in the frontal direction of the vehicle, the beam axis of the radar device is not perpendicular to the bumper, which gives rise to a possibility that the radar device cannot obtain a desired detection performance. It is also conceivable to change the direction of the bumper to an oblique direction so as to agree with the radar device that is disposed obliquely relative to the frontal direction of the vehicle. However, since the direction of the bumper greatly affects the design of the vehicle, it is desirable that the direction of the bumper remain unchanged.

SUMMARY OF THE INVENTION

The invention provides a radar apparatus that allows a radar device to be placed obliquely to the frontal direction of the vehicle while restraining performance decline of the radar device.

A first aspect of the invention relates to a radar apparatus that is mounted in a vehicle. This radar apparatus includes: an inward bent surface that is formed in a lower portion of a bumper of the vehicle, and that curves inward with a higher degree of curvature in a horizontal plane than a bumper surface of an upper portion of the inward bent surface; and a radar device that is placed behind the inward bent surface so that a beam axis of the radar device penetrates the inward bent surface.

According to the first aspect, the radar device is placed so that the radar wave passes through the inward bent surface that curves inward with a higher degree of curvature in a horizontal plane than a bumper surface of an upper portion of the inward bent surface. Because of this, the detection performance of the radar device can be caused to have a characteristic with less deviation in the left-right direction of the vehicle, and the incident angel of the radar wave on the inward bent surface can be prevented from becoming excessively large. Therefore, even in the case where a radar device is placed obliquely to the frontal direction of a vehicle, the decline in the detection performance of the radar device can be restrained. Therefore, the radar apparatus according to the first aspect of the invention is able to provide a radar device that is good in detection performance.

A second aspect of the invention relates to a vehicle. This vehicle includes the radar apparatus described above.

A third aspect of the invention relates to a radar apparatus that is mounted in a vehicle. This radar apparatus includes: a surface that is formed at a side portion of the vehicle so as to face in a direction oblique with respect to the longitudinal direction of the vehicle; and a radar device that is placed behind the surface so that a beam axis of the radar device penetrates the surface.

According to the invention, since a radar device is placed behind the inward bent surface that curves inward with a higher degree of curvature in a horizontal plane than a bumper surface of an upper portion of the inward bent surface, a radar device having good detection performance can be provided even in the case where the radar device is attached obliquely to the frontal direction of the vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
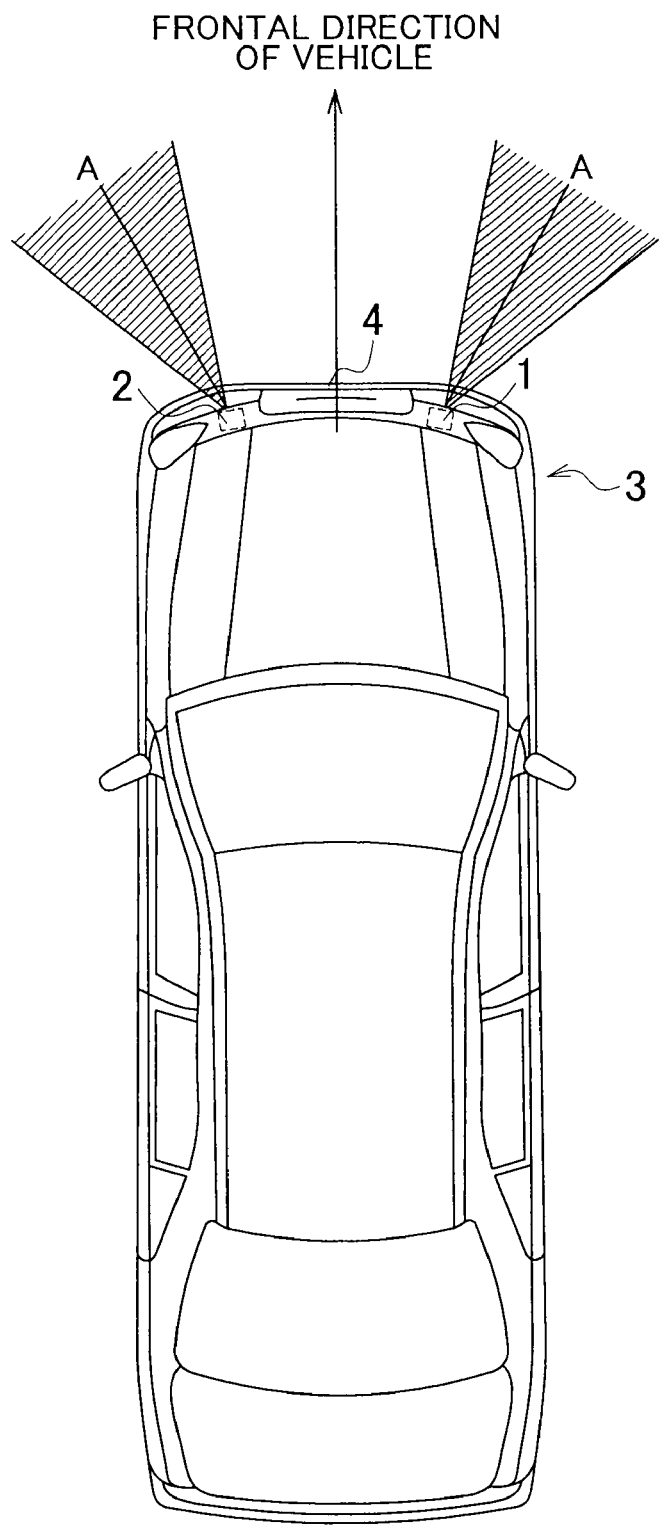
FIG. 1 is a diagram showing the placement of radar devices in a vehicle in accordance with an embodiment of the invention.

Hereinafter, a radar device in accordance with an embodiment of the invention will be described. In FIG. 1, radar devices 1 and 2 of the radar apparatus are mounted on a vehicle 3, and detect obstacles (vehicles, and the like) that are present around the vehicle 3. As the radar devices 1 and 2, millimeter wave radars are typically used.

In this embodiment, the radar devices 1 and 2 are installed for detecting obstacles present obliquely forward of the vehicle 3, in order to, for example, warn against or avoid colliding with each other in passing, such as a collision at a crossroad, or the like. That is, the radar devices 1 and 2 are attached to a site on the vehicle 3 that is adjacent to a bumper 4 of the vehicle 3, so as to face in a direction obliquely forward of the vehicle 3, as shown in FIG. 1. Concretely, each of the radar devices 1 and 2 is attached so that a beam axis A thereof faces to a direction which forms an angle with the frontal direction of the vehicle 3. The radar device 1 attached to a front right portion of the vehicle 3 is attached so that the beam axis A faces forward-rightward from the vehicle, while the radar device 2 attached to a front left portion of the vehicle 3 is attached so that the beam axis A faces forward-leftward from the vehicle. Incidentally, hatched regions in FIG. 1 represent the detection ranges (monitoring ranges) of the radar devices 1 and 2.

Next, details of the placement of the radar device 1 will be described with reference to FIG. 2 and FIG. 3. In the following description, the placement of the radar device 1 installed in a front right portion of the vehicle 3 will be described, and it is to be noted that the radar device 2 installed in a front left portion of the vehicle 3 is placed in substantially the same manner as the radar device 1, except for their left/right differences.

Figure 2:
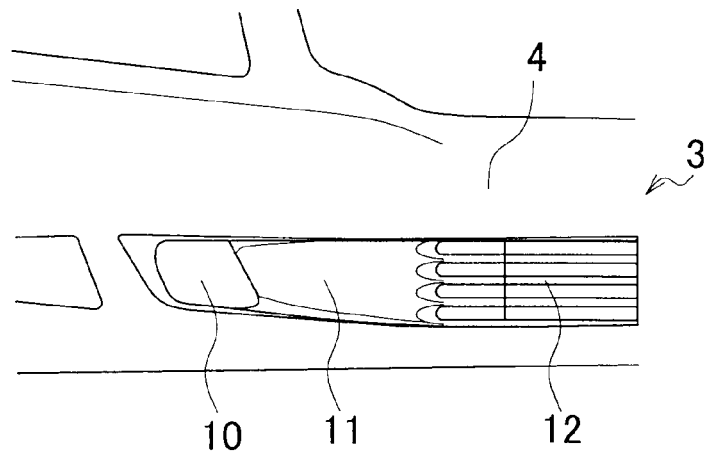
FIG. 2 is a diagram showing an exterior of a front right portion of a vehicle.

As shown in FIG. 2, the vehicle 3 has an air intake opening 10 in a lower portion of the bumper 4. The air intake opening 10, typically, is formed for brake cooling, and is connected to a brake duct. However, in this embodiment, the air intake opening 10 does not necessarily need to be used for brake cooling. Around this air intake opening 10, a surface 11 (hereinafter referred to as "inward bent surface 11") is formed, and is curved inward relative to the vehicle so as to sink from a surface of the bumper 4, in order to facilitate the introduction of air. In FIG. 3, the inward bent surface 11 is formed between the air intake opening 10 and a lower grille 12 that is provided in a central portion of a lower portion of the bumper 4 in the width direction of the vehicle 3. In addition, the material of the inward bent surface 11 is ordinarily a resin that is the same as the material of the bumper 4, but may also be any other material as long as it transmits radar waves. The radar device 1 is placed behind the inward bent surface 11.

Figure 3:
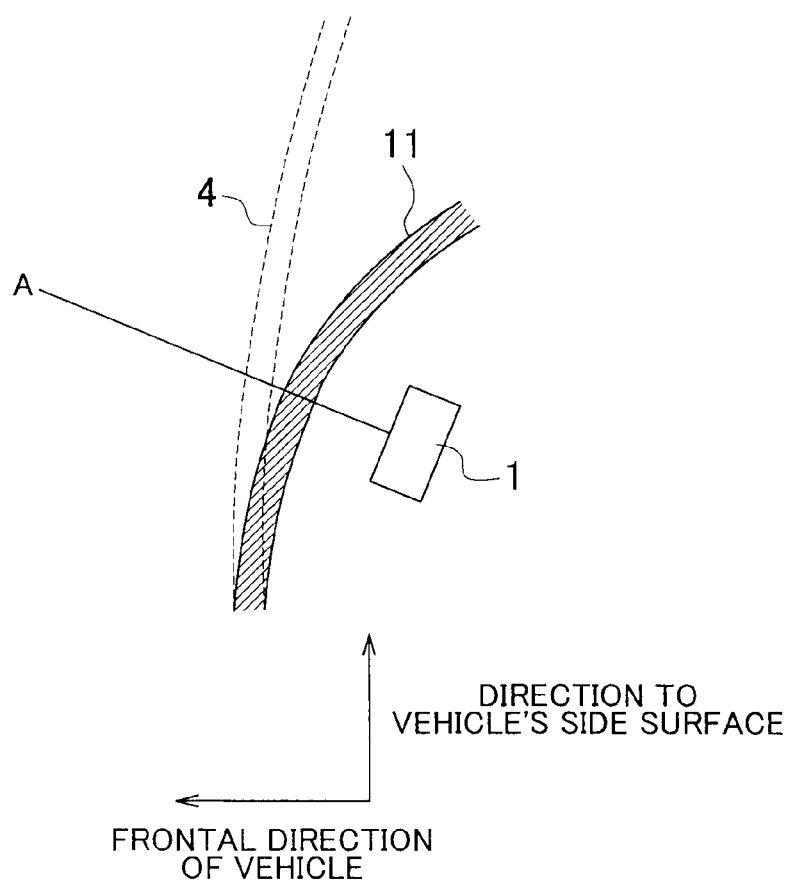
FIG. 3 is a sectional view of an inward bent surface shown in FIG. 2 which is viewed from above.

Dotted lines shown in FIG. 3 show a cross section of the bumper 4 that is located above the inward bent surface 11. As shown in FIG. 3, since the inward bent surface 11 is formed so as to sink as compared with the bumper 4 that is above the inward bent surface 11, the inward bent surface 11 faces further toward the side surface side of the vehicle 3 (a lateral side) as compared with the bumper surface that is located in the upper portion of the inward bent surface 11. That is, the inward bent surface 11 curves inward with a higher degree of curvature in a horizontal plane than a bumper surface of an upper portion of the inward bent surface, and is formed so as to face in a direction oblique with respect to the longitudinal direction of the vehicle. Besides, the curvature factor of the inward bent surface 11 is greater than the curvature factor of the surface of the bumper 4. As shown in FIG. 3, the radar device 1 is disposed on the vehicle so that the beam axis A penetrates the inward bent surface 11.

As described above, because the radar device 1 is placed behind the inward bent surface 11 that faces more toward the side surface side of the vehicle 3 than the bumper surface of the bumper 4 that is located in upper portion of the inward bent surface 11, it is possible to restrain the performance decline of the radar device 1 which tends to occur in the case where the radar device 1 is placed so that the beam axis A faces in a direction that is shifted to the side surface side from the longitudinal direction of the vehicle 3. In the following description, the attachment angle (α) is an angle formed between the beam axis A of the radar device 1 and a normal line to the inward bent surface 11 (or the bumper 4). Besides, the incident angle is an angle formed by the radar wave radiated from the radar device 1 and the foregoing normal line.

Figure 4:
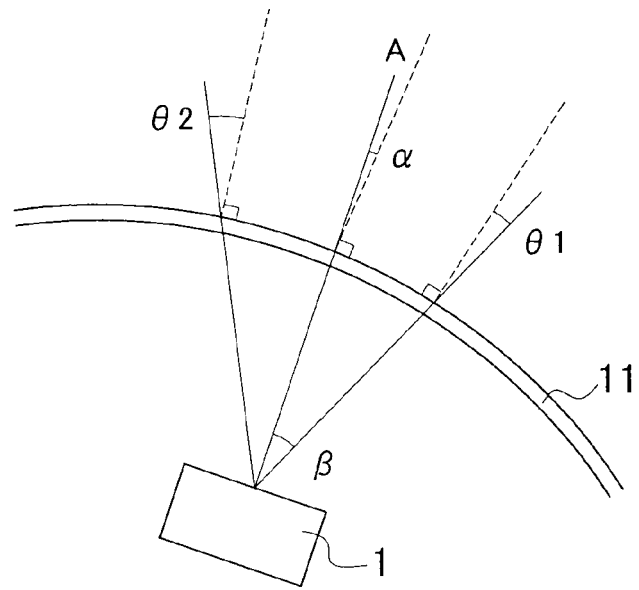
FIG. 4 is a diagram showing the attachment angle of a radar device and the incident angles in the case where the radar device is placed on the reverse side of the inward bent surface in accordance with the embodiment of the invention.
Figure 5:
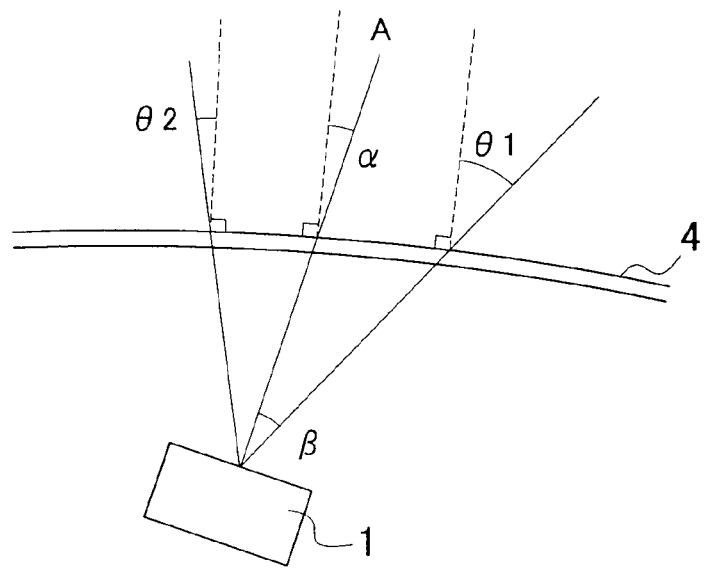
FIG. 5 is a diagram showing the attachment angle of a radar device and the incident angles in the case where the radar device is placed on the reverse side of a bumper.

In the case where the radar device 1 is placed behind the inward bent surface 11 as shown in FIG. 4, the attachment angle α can be made relatively small (as compared with the case shown in FIG. 5), so that the incident angle θ1 and the incident angle θ2 of the radar wave at the boundary of the detection range of the radar device 1 can be made close in value to each other. That is, in the foregoing case, the inward bent surface 11 is placed nearly symmetrically with respect to the beam axis A, so that the detection performance of the radar device 1 has a characteristic with a reduced deviation in the left-right direction of the vehicle. On the other hand, in the case where the radar device 1 is placed behind the bumper 4 in a manner as shown in FIG. 5, the attachment angle α is relatively large, and the bumper 4 is asymmetrical with respect to the beam axis A. Therefore, the incident angles θ1 and θ2 of the radar wave at the boundary between the inside of the detection range (the inside of the range of directions in which detection is possible) of the radar device 1 and the outside of the detection range thereof have a large difference, and one of the incident angles (θ1 in FIG. 5) becomes very large in value. Hence, in the case shown in FIG. 5, the detection performance of the radar device 1 has a characteristic with a deviation in the left-right direction of the vehicle.

Besides, in the case where the radar device 1 is placed behind the inward bent surface 11 as shown in FIG. 4, since the curvature factor of the inward bent surface 11 is large, the absolute values of the incident angles θ1 and θ2 can be made smaller than in the case where the radar device 1 is placed behind the bumper 4 which is located in the upper portion of the inward bent surface 11. In the case where the radar device 1 is placed behind the bumper 4 as shown in FIG. 5, one of the absolute values of the incident angles θ1 and θ2 (θ1 in FIG. 5) becomes very large in value. In addition, this feature appears more conspicuously the broader the detection range of the radar device 1 is (the wider the detection angle of the radar device employed is).

As described above, since the radar device 1 is placed behind the inward bent surface 11, the deviation of the detection performance of the radar device 1 can be restrained, and the incident angle can be made small, in comparison with the case where the radar device 1 is placed behind the bumper 4. Hence, the deterioration of the detection performance of the radar device 1 caused by the left-right deviation or the large incident angle can be prevented.

Figure 6:
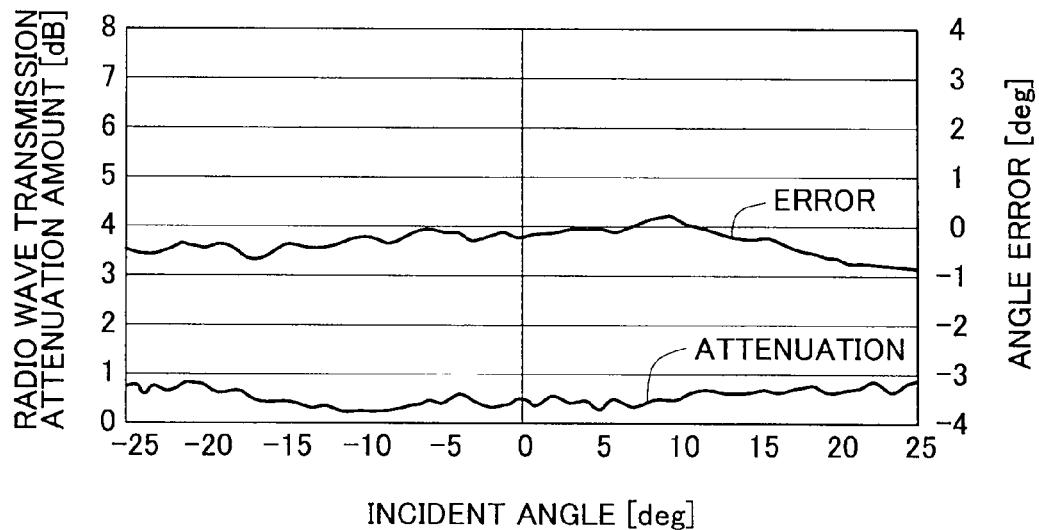
FIG. 6 is a diagram showing the detection performance of a radar device in accordance with the embodiment of the invention.

A graph shown in FIG. 6 represents a relation between the incident angle (horizontal axis) and the radio wave transmission attenuation amount (vertical axis), and a relation between the incident angle and the angle error (vertical axis). The graph of FIG. 6 shows the detection performance of the radar device 1 in the case where the radar device 1 has a detection range of 25° to each of the left and the right from the beam axis of the radar device 1, and where the attachment angle α of FIG. 4 is 5.7°, and the incident angle θ1 of FIG. 4 is 11.6° and the incident angle θ2 of FIG. 4 is 22.5°. In the graph shown in FIG. 6, the angle error (a difference between the value of the angle that represents the actual direction of a vehicle or the like that is a detection object and the angle at which the vehicle or the like is actually detected) is a small value within ±1.0° over the entire detection range, and it can be understood that good detection performance is obtained. Besides, in the case where the incident angle is small as shown in FIG. 4, it is conceivable that the influence of reflected wave becomes great. However, in the graph shown in FIG. 6, the radio wave transmission attenuation amount is within 2 dB over the entire detection range, and it can be understood that there is no problem with regard to the radio wave transmission attenuation. Thus, by placing the radar device 1 behind the inward bent surface 11, good detection performance can be obtained.

Figure 7:
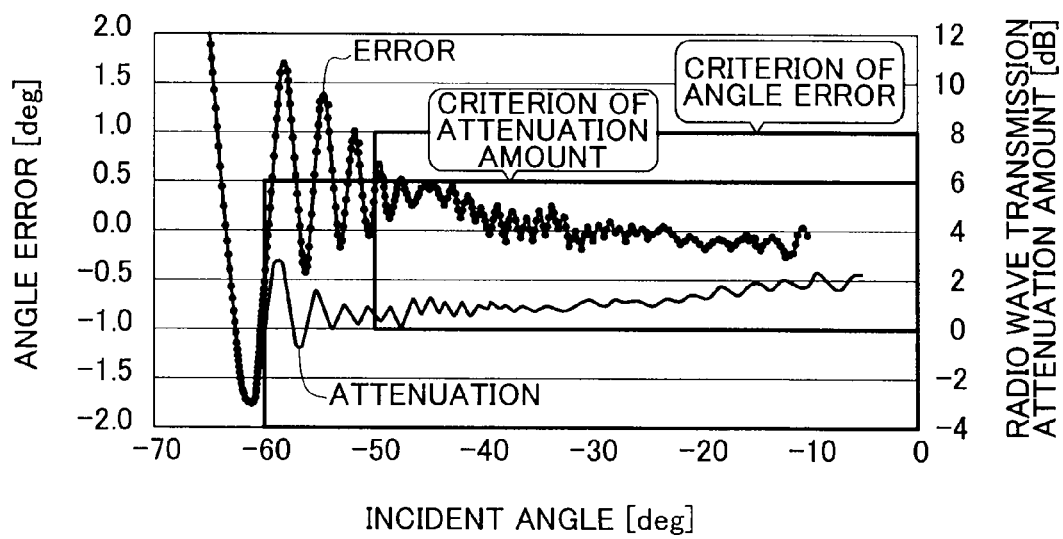
FIG. 7 is a diagram showing relations of the incident angle of radar wave with the angle error and the radio wave transmission attenuation amount.

In a graph shown in FIG. 7, the horizontal axis represents the incident angle [°] of the radar wave, and the vertical axis represents the angle error [°] and the radio wave transmission attenuation amount [dB]. From the graph shown in FIG. 7, it can be understood that the greater the absolute value of the incident angle becomes, the more deteriorated the angle error and the radio wave transmission attenuation amount becomes. Herein, permissible references of the performance of the radar device 1 are assumed to be within ±1° for the angle error, and within 6 dB for the radio wave transmission attenuation amount. At this time, it can be understood that the foregoing references are satisfied in the case where the incident angle is 50° or less. Therefore, it is preferable to set the radar device 1 so that the incident angle in the detection range be less than or equal to 50°. For example, in the case where the inward bent surface 11 is a flat surface, and where the radar device 1 has a detection range of 25° to each of the left and the right from the beam axis A, it is preferable that the attachment angle α be less than or equal to (50−25=) 25°. Even if the radar device 1 has a detection range of 25° to each of the left and the right from the beam axis A, in the case where the inward bent surface 11 is a curved surface which is outward convex, the attachment angle may exceed 25° as long as the incident angle is within 50° in the radar detection range. By placing the radar device 1 behind the inward bent surface 11 as in the embodiment, it becomes easy to satisfy the condition that the incident angle be within 50°.

As described above, according to the embodiment, by placing each of the radar devices 1 and 2 behind the inward bent surface 11, good detection performance can be obtained even in the case where the radar devices 1 and 2 are placed so that the beam axes A thereof face obliquely to the frontal direction of the vehicle.

Incidentally, the foregoing embodiment has been described in conjunction with the case where the radar devices 1 and 2 are attached to a front portion of the vehicle 3, the positions at which the radar devices 1 and 2 are attached may be any position, for example, side portions of the vehicle 3, or a rear portion thereof. That is, the radar devices 1 and 2 may be attached so that the beam axes A thereof face obliquely rearward of the vehicle. Incidentally, in the case where the radar devices 1 and 2 face obliquely rearward of the vehicle 3, it suffices that the inward bent surface 11 be an inward bent surface around an air intake opening that is formed in a rear portion of the vehicle 3.

The invention is applicable to, for example, a radar apparatus mounted in a front portion of a vehicle, or the like, for the purpose of placing the radar device or the like obliquely to the frontal direction of the vehicle while restraining the performance decline of the radar device.

What is claimed is:

1. A radar apparatus mounted in a vehicle, comprising:
   an inward bent surface provided in a lower portion of a bumper of the vehicle, the inward bent surface curving inward with a higher degree of curvature in a horizontal plane than a bumper surface of an upper portion of the inward bent surface; and
   a radar device positioned behind the inward bent surface so that a beam axis of the radar device penetrates the inward bent surface.

2. The radar apparatus according to claim 1, wherein the inward bent surface is positioned to face in a direction oblique with respect to the longitudinal direction of the vehicle.

3. The radar apparatus according to claim 1, further comprising:
   an air intake opening connected to the inward bent surface.

4. The radar apparatus according to claim 3, wherein the air intake opening is an air intake opening of a brake duct.

5. The radar apparatus according to claim 1, wherein the radar device is positioned so that an incident angle of radar wave with respect to a direction of a normal line to the inward bent surface is less than or equal to 50° in a detection range of the radar device.

6. The radar apparatus according to claim 1, wherein the radar device is positioned so that angle error is within ±1°, and radio transmission attenuation of the inward bent surface is within 6 dB.

7. The radar apparatus according to claim 1, wherein when the inward bent surface is a flat plane and the radar device has a detection range of 25° to each of left and right from the beam axis, the radar device is positioned so that attachment angle of the radar device is less than or equal to 25°.

8. The radar apparatus according to claim 1, wherein a curvature factor of the inward bent surface is larger than a curvature factor of the bumper.

9. A vehicle that includes the radar apparatus according to claim 1.

* * * * *